(12) United States Patent
Harned et al.

(10) Patent No.: US 7,443,514 B2
(45) Date of Patent: Oct. 28, 2008

(54) DIFFRACTIVE NULL CORRECTOR EMPLOYING A SPATIAL LIGHT MODULATOR

(75) Inventors: Nora-Jean Harned, Redding, CT (US); Robert D. Harned, Redding, CT (US)

(73) Assignee: ASML Holding N.V., Veldhoven (NL)

( * ) Notice: Subject to any disclaimer, the term of this patent is extended or adjusted under 35 U.S.C. 154(b) by 85 days.

(21) Appl. No.: 11/540,674

(22) Filed: Oct. 2, 2006

(65) Prior Publication Data

US 2008/0079950 A1 Apr. 3, 2008

(51) Int. Cl.
*G01B 11/02* (2006.01)
*G01B 9/02* (2006.01)

(52) U.S. Cl. ...................... 356/512; 356/521
(58) Field of Classification Search .............. 356/511, 356/512, 513, 514, 515, 521
See application file for complete search history.

(56) References Cited

U.S. PATENT DOCUMENTS

| | | | |
|---|---|---|---|
| 4,560,249 A | 12/1985 | Nishiwaki et al. |
| 4,596,467 A | 6/1986 | Bartelt |
| 4,792,197 A | 12/1988 | Inoue et al. |
| 4,806,454 A | 2/1989 | Yoshida et al. |
| 5,142,385 A | 8/1992 | Anderson et al. |
| 5,414,835 A | 5/1995 | Iijima |
| 5,640,239 A | 6/1997 | Takamiya et al. |
| 5,705,321 A | 1/1998 | Brueck et al. |
| 5,759,744 A | 6/1998 | Brueck et al. |
| 5,771,098 A | 6/1998 | Ghosh et al. |
| RE36,113 E | 2/1999 | Brueck et al. |
| 6,013,396 A | 1/2000 | Capodieci |
| 6,178,000 B1 | 1/2001 | Hoffnagle |
| 6,185,019 B1 | 2/2001 | Hobbs et al. |
| 6,233,044 B1 | 5/2001 | Brueck et al. |

(Continued)

FOREIGN PATENT DOCUMENTS

EP    0243520 B1    11/1991

(Continued)

OTHER PUBLICATIONS

Oliver et al., "Advanced Wavefront Control Techniques," U.S. Department of Energy, 79 pages, Feb. 21, 2001.

(Continued)

*Primary Examiner*—Michael A Lyons
(74) *Attorney, Agent, or Firm*—Sterne, Kessler, Goldstein & Fox P.L.L.C.

(57) ABSTRACT

The present invention is directed to a system and method for using a spatial light modulator (SLM) to perform a null test of an (aspheric) optical surface. In an embodiment, such a system includes an interferometer, an optical element, and an SLM. The interferometer provides electromagnetic radiation. The optical element conditions the electromagnetic radiation to provide a first beam of radiation and a second beam of radiation. The SLM shapes a wavefront of the first beam of radiation resulting in a shaped wavefront corresponding to an optical surface. The shaped wavefront is incident on and conditioned by the optical surface. The shape of the optical surface is analyzed based on a fringe pattern resulting from interference between the shaped wavefront mapped by the optical surface and the second beam of radiation. The system may also include an optical design module that converts a null corrector design corresponding to the optical surface into instructions for the SLM.

20 Claims, 11 Drawing Sheets

U.S. PATENT DOCUMENTS

| | | |
|---|---|---|
| 6,304,318 B1 | 10/2001 | Matsumoto |
| 6,556,280 B1 | 4/2003 | Kelsey et al. |
| 6,630,656 B2 * | 10/2003 | Wirth .................. 250/201.9 |
| 6,830,850 B1 | 12/2004 | Krivokapic et al. |
| 6,882,477 B1 | 4/2005 | Schattenburg et al. |
| 7,212,291 B2 * | 5/2007 | De Lega et al. ............ 356/512 |
| 7,283,250 B2 * | 10/2007 | Schmit et al. ............ 356/512 |
| 2001/0021487 A1 | 9/2001 | Williams et al. |
| 2001/0035991 A1 | 11/2001 | Hobbs et al. |
| 2002/0030802 A1 | 3/2002 | Sugita et al. |
| 2002/0031725 A1 | 3/2002 | Sugita et al. |
| 2002/0134985 A1 | 9/2002 | Chen et al. |
| 2002/0149751 A1 | 10/2002 | Bloomstein et al. |
| 2002/0149757 A1 | 10/2002 | Kelsey et al. |
| 2002/0149849 A1 | 10/2002 | Kelsey et al. |
| 2003/0098979 A1 | 5/2003 | Dress et al. |
| 2003/0147082 A1 | 8/2003 | Goldstein |
| 2004/0042724 A1 | 3/2004 | Gombert et al. |
| 2004/0110092 A1 | 6/2004 | Lin |
| 2005/0012933 A1 | 1/2005 | Matthews |
| 2005/0057735 A1 | 3/2005 | Smith |
| 2005/0064297 A1 | 3/2005 | Wago |
| 2005/0073671 A1 | 4/2005 | Borodovsky |
| 2005/0074698 A1 | 4/2005 | Borodovsky |
| 2005/0088633 A1 | 4/2005 | Borodovsky |
| 2005/0094152 A1 | 5/2005 | Allen |
| 2005/0105100 A1 | 5/2005 | Swindal |
| 2005/0168717 A1 | 8/2005 | Hinsberg, III et al. |
| 2006/0268282 A1 * | 11/2006 | Evans et al. .............. 356/515 |

FOREIGN PATENT DOCUMENTS

| | | |
|---|---|---|
| JP | 61-190368 A | 8/1986 |
| JP | 3-263313 A | 11/1991 |
| JP | 4-163461 A | 6/1992 |
| JP | 5-072408 A | 3/1993 |
| JP | 5-217856 A | 8/1993 |
| JP | 6-053122 A | 2/1994 |
| JP | 6-053122 U | 7/1994 |
| JP | 10-270330 A | 10/1998 |
| JP | 2000-021716 A | 1/2000 |
| JP | 2000-021720 A | 1/2000 |
| JP | 2000-223400 A | 8/2000 |
| JP | 2001-007020 A | 1/2001 |
| JP | 2001-223149 A | 8/2001 |
| JP | 2002-162750 A | 6/2002 |
| JP | 2004-014866 A | 1/2004 |
| JP | 2004-014867 A | 1/2004 |
| JP | 2004-317922 A | 11/2004 |
| JP | 2005-099537 A | 4/2005 |
| JP | 2005-134873 A | 5/2005 |
| KR | 9401227 B1 | 2/1994 |
| WO | WO 98/18049 A1 | 4/1998 |
| WO | WO 03/022139 A1 | 3/2003 |
| WO | WO 2004/003611 A1 | 1/2004 |
| WO | WO 2004/088363 A1 | 10/2004 |
| WO | WO 2004/113856 A1 | 12/2004 |

OTHER PUBLICATIONS

Zygo, "Transmission Sphere Selection," 4 pages, 2004, printed from http://www.zygo.com/library/optical/ts_selection_guide.pdf, printed on Aug. 15, 2006.

Blanchard et al., "Phase-Diversity Wave-Front Sensing with a Distorted Diffraction Grating," Dec. 10, 2000, vol. 39, No. 35, Applied Optics, pp. 6649-6655.

Otten et al., "Comparison Between a Shack-Hartmann and a Distorted Grating Wavefront Sensor," Proceedings of the SPIE—The International Society for Optical Engineering, vol. 4884 (2003), pp. 176-185.

Chang et al., "A Grating-Based Curvature Sensor," Proceedings of SPIE—The International Society for Optical Engineering, vol. 4926 (2002), pp. 101-106.

Blanchard et al., "Simultaneous Multiplane Imaging with a Distorted Diffraction Grating," Applied Optics, vol. 38, No. 32, Nov. 10, 1999, pp. 6692-6699.

Neil et al., "Dynamic Wave-Front Generation for the Characterization and Testing of Optical Systems," Optics Letters, Dec. 1, 1998, vol. 23, No. 23, pp. 1849-1851.

* cited by examiner

DIFFRACTIVE NULL CORRECTOR EMPLOYING A SPATIAL LIGHT MODULATOR

BACKGROUND OF THE INVENTION

1. Field of the Invention

The present invention is generally directed to lithography, and more particularly to testing lithographic apparatuses.

2. Background Art

A null corrector is a device that may be used to analyze an optical surface, such as a spherical optical surface or an aspherical optical surface. A typical null corrector includes an interferometer, reference optics (such as one or more mirrors and/or one or more lens), and a test optical surface. The interferometer provides a test beam and a reference beam. The test beam is conditioned by the reference optics and then incident on the test optical surface. If the test optical surface is "ideal" (i.e., fabricated within predetermined specifications), the beam conditioned by the reference optics impinges on the test optical surface at (approximately) normal incidence. A wavefront that impinges on a test optical surface at (approximately) normal incidence is referred to herein as a "null wavefront." The test optical surface further conditions the test beam. Thereafter, the test beam reenters the interferometer and interferes with the reference beam resulting in a fringe pattern, or more specifically an interferogram. Based on the interferogram, the test optical surface may be analyzed to determine if it has been fabricated within the predetermined specifications.

Null correctors may be built using conventional optical elements or diffractive optical elements. Conventional optical elements include refractive elements, reflective elements, and/or a combination of refractive and reflective elements. Null correctors that include refractive and/or reflective optical elements have limitations with respect to accuracy and the types of aspheric surfaces that can be tested. Diffractive null correctors can typically test many different types of aspherical optical surfaces and are typically more accurate than null correctors that include conventional optical elements. A diffractive null corrector includes a diffraction grating that is configured to produce a null wavefront corresponding to an optical surface being tested.

A problem with null correctors is that they are expensive to fabricate. A typical null corrector is designed to analyze a specific aspheric profile. It is rare that a null corrector can be used to test an optical surface other then the one it was originally designed to analyze. The non-recurring cost associated with a null corrector significantly adds to the cost and delivery schedule of an optical element that is analyzed by a null corrector. Because aspherical optical surfaces are typically analyzed using a null corrector, typical asphere-based optical designs cost more and take longer to fabricate than all-sphere optical designs. Thus, although an asphere-based optical design typically has superior optical quality compared to an all-sphere optical design, cost and schedule usually drive customers to select all-sphere optical designs.

To avoid the typical high cost and schedule delays associated with asphere-based optical designs, software-based null correctors have been used to test the aspherical optical elements. In such software-based null correctors, the effect of the aspheric surface is not canceled out prior to entering the interferometer. Rather, an aberrated wavefront is allowed to propagate through the interferometer. The amount of error a perfectly fabricated aspheric surface would cause in the interferometer is calculated using a ray tracing program and then subtracted from the wavefront that is actually measured. The difference between the actual and predicted wavefronts is used as a measure of the surface error in the aspherical optical surface being analyzed. However, this technique only works over a limited range of asphericity because aberrations due to the asphericity can cause rays propagating through the interferometer system to be vignetted, and thereby prevent the whole optical surface from being analyzed.

Given the foregoing, what is needed is an improved diffractive null corrector that may be re-used to test optical surfaces of various shapes. Such an improved diffractive null corrector should allow for a reduction in the cost of fabricating diffractive null correctors. Furthermore, such an improved diffractive null corrector should allow for compensation of unexpected errors or problems occurring in the optics of the diffractive null corrector.

BRIEF SUMMARY OF THE INVENTION

Embodiments of the present invention meet the above-identified needs by providing a diffractive null corrector employing a spatial light modulator (SLM) to generate aspheric wavefronts. Such a diffractive null corrector allows for a reduction in the cost of fabrication because a diffractive null corrector using an SLM may be used to analyze aspherical optical surfaces of almost any profile. Furthermore, because the actuation state of pixels of the SLM may be varied, a diffractive null corrector employing SLMs may compensate for unexpected errors or problems occurring in the optics of the diffractive null corrector.

In accordance with an embodiment of the present invention there is provided a system for testing an optical surface, including an interferometer, an optical element, and an SLM. The interferometer provides electromagnetic radiation. The optical element conditions the electromagnetic radiation to provide a first beam of radiation and a second beam of radiation. The SLM shapes a wavefront of the first beam of radiation resulting in a shaped wavefront corresponding to an optical surface. The shaped wavefront is incident on and conditioned by the optical surface. The shape of the optical surface is analyzed based on a fringe pattern resulting from interference between the shaped wavefront mapped by the optical surface and the second beam of radiation. The system may also include an optical design module that converts a null corrector design corresponding to the optical surface into instructions for the SLM.

In accordance with another embodiment of the present invention there is provided a method for testing an optical surface that includes the following steps. A first beam of radiation and a second beam of radiation are provided. A wavefront of the first beam of radiation is shaped by an SLM resulting in a shaped wavefront corresponding to the optical surface. The shaped wavefront is conditioned with the optical surface. A fringe pattern is produced based on interference between the shaped wavefront conditioned by the optical surface and the second beam of radiation. The shape of the optical surface is analyzed based on the fringe pattern. The method may also include converting a null corrector design corresponding to the optical surface into instructions for the SLM.

In a further feature, any residual position errors associated with the actuation state of the SLM pixels can be calibrated. In this example, the SLM pixels are set to generate a spherical wavefront, instead of using the SLM to create an aspheric wavefront. An advantage of a spherical wavefront is the relative ease with which an absolute calibration on that wavefront may be performed. Based on this calibration, data may be incorporated into a module that generates a grating pattern used in a null test. A null test that utilizes such a calibration technique will have greater accuracy compared to a null test that does not include any such calibration technique.

A diffractive null corrector employing an SLM in accordance with an embodiment of the present invention has several example advantages over conventional null correctors. For example, diffractive null correctors employing SLMs may reduce the costs and schedule delays associated with building null correctors because such a diffractive null corrector may be used to analyze optical surfaces of various shapes.

As another example, grating patterns may be created on the SLM that enable auxiliary optics to be aligned without adding a diffractive alignment element, because the grating pattern on the SLM may be changed in approximately real time. After the auxiliary optics are aligned, the grating pattern on the SLM may be changed to generate the null wavefront for analyzing an aspherical optical surface. As necessary the pixels on the SLM may be adjusted from the null pattern back to the alignment patterns, so the test system alignment can be monitored.

As a still further example, a diffractive null corrector employing an SLM may compensate for low fringe contrast by using a gray scaling capability of the SLM. In a typical null corrector, low fringe contrast may compromise the accuracy of an interferometric measurement. A difference in the amplitude of the test and reference beams in the interferometer can cause a reduction in fringe contrast. The amplitude of electromagnetic radiation emerging from an SLM may be adjusted using a technique called "gray scaling." Using such a gray scaling technique, the amplitude of the test beam may be adjusted to match the reference beam, and thereby ensuring maximum fringe contrast during a null test.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
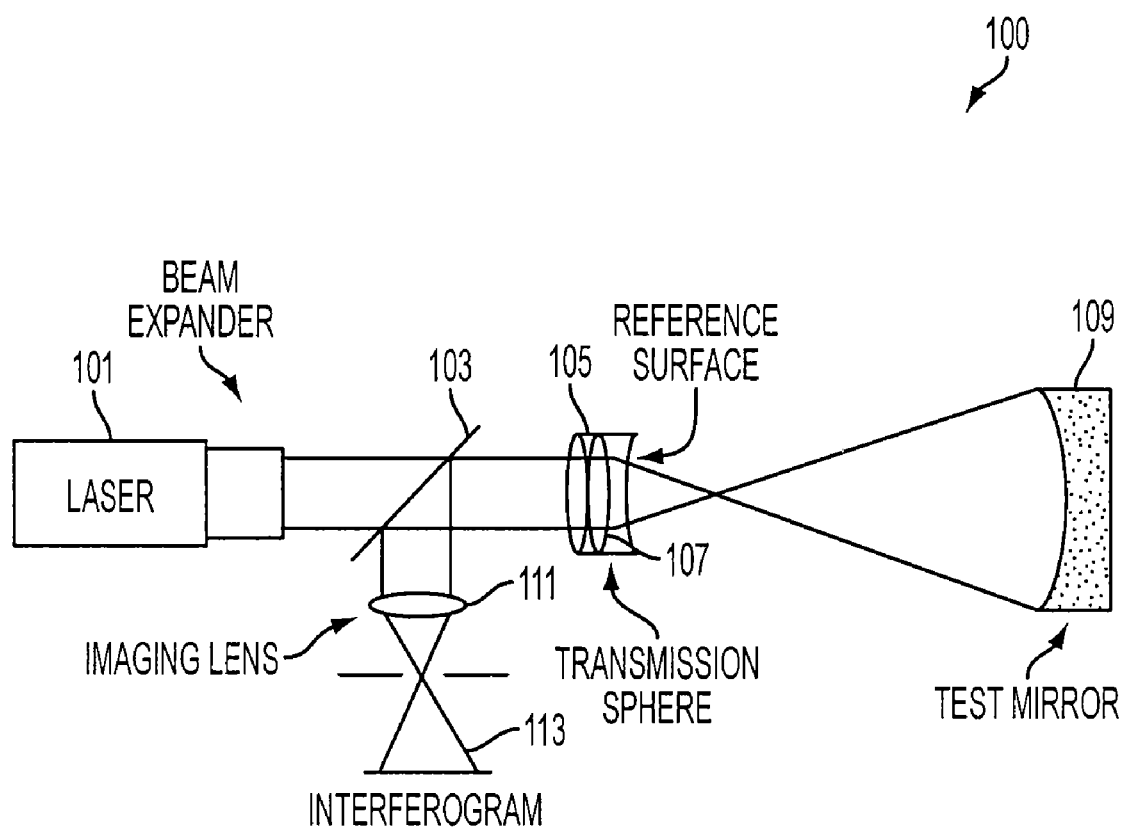
FIG. 1 depicts a diagram of an example Fizeau interferometer that may be used to test an optical surface.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

I. Introduction

A. Overview

Embodiments of the present invention are directed to a diffractive null corrector employing an SLM and a method for using such a diffractive null corrector. An example diffractive null corrector in accordance with an embodiment of the present invention is used to test an aspheric optical surface. In this embodiment, an interferometer provides a test beam of electromagnetic radiation to the SLM. The test beam is focused to have an f-number that is nominally optically conjugate to the aspheric optical surface being tested. In an embodiment, the test beam may be focused by the SLM. The test beam is first incident on the SLM. Pixels of the SLM are selectively turned ON/OFF to provide a grating pattern that generates a wavefront shape resulting in a null test of the aspheric optical surface.

A null corrector changes the direction of rays that make up an input beam so each ray hits an optical surface at normal incidence. If the optical surface is (substantially) perfect each ray incident on the optical surface will exactly retrace its path back to the interferometer. Typically, a specific null corrector is fabricated to test a specific optical surface. Such a null corrector cannot typically be used to test other optical surfaces because it cannot redirect rays to be normal to these other optical surfaces. In contrast, a diffractive null corrector in accordance with an embodiment of the present invention may be re-used to provide a null test of aspheric optical surfaces of various shapes because the SLM pixels may be adjusted to redirect rays to be normal to optical surfaces of various shapes. Consequently, a null corrector in accordance with an embodiment of the present invention provides several advantages over a typical diffractive null corrector. For example, a diffractive null corrector that employs SLMs in accordance with an embodiment of the present invention may reduce the costs and schedule delays associated with building a typical null corrector.

To create a desired grating pattern on the SLM to perform a null test, an optical design module is used. In a typical diffractive null corrector, a design module is used to write a lithographic mask corresponding to the aspheric optical surface being tested. Rather than writing a lithographic mask, a design module in accordance with an embodiment of the present invention is used to generate instructions for pixels of the SLM. Shortly after completing the diffractive null corrector design, the desired grating pattern can be on the SLM and testing of the aspheric optical surface may begin.

In an embodiment, the SLM does not produce an exact null test configuration. Rather, in this embodiment, the SLM is used to compensate for asphericity and a software null is used to correct for residual error(s).

B. Definitions

The term "Spatial Light Modulator" (SLM) as here employed should be broadly interpreted as referring to any device that can be used to endow an incoming radiation beam with a patterned cross-section, so that a desired pattern can be created in a target portion of the substrate (such as an aspherical optical surface being tested). An SLM may be either a reflective or a transmissive device. Examples of particular kinds of SLMs—namely, programmable mirror arrays and grating light valves—are discussed herein for illustrative purposes only, and not limitation. The present invention is not limited, however, to programmable mirror arrays or grating light valves. Based on the description contained herein, a person skilled in the relevant art(s) will understand how to implement the present invention using other types of reflective SLMs, transmissive SLMs, or a combination thereof.

In an embodiment, a programmable mirror array may comprise a matrix-addressable surface having a viscoelastic control layer (i.e., a surface having appreciable and conjoint viscous and elastic properties) and a reflective surface. The basic principle behind such an apparatus is that, for example, addressed areas of the reflective surface reflect incident light as diffracted light, whereas unaddressed areas reflect incident light as undiffracted light. The addressing can be binary or through any one or more multiple intermittent angles. Using an appropriate spatial filter, the undiffracted light can be filtered out of the reflected beam, leaving only the diffracted light to reach the substrate. In this manner, the beam becomes patterned according to the addressing pattern of the matrix-addressable surface.

In another embodiment, a grating light valve may be used to filter out the diffracted light, leaving the undiffracted light to reach the substrate. In this embodiment, an array of diffractive optical MEMS devices can also be used in a corresponding manner. Each diffractive optical MEMS device can include a plurality of reflective ribbons that can be deformed relative to one another to form a grating that reflects incident light as diffracted light.

A further embodiment includes a programmable mirror array employing a matrix arrangement of tiny mirrors, each of which can be individually tilted about an axis by applying a suitable localized electric field, or by employing piezoelectric actuation means. Once again, the mirrors are matrix-addressable, such that addressed mirrors will reflect an incoming radiation beam in a different direction to unaddressed mirrors. In this manner, the reflected beam is patterned according to the addressing pattern of the matrix-addressable mirrors. The required matrix addressing can be performed using suitable electronic means. In one example, groups of the mirrors can be coordinated together to be addresses as a single "pixel." In this example, an optical element in a illumination system can form beams of light, such that each beam falls on a respective group of mirrors. This is sometimes referred to as a digital mirror device.

It is noted that references in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Diffractive Null Correctors

Before describing embodiments of the present invention in detail, it is helpful to provide an overview of diffractive null correctors. As mentioned above, a typical null corrector includes an interferometer, reference optics (such as one or more mirrors and/or one or more lens), and a test optical surface. Example interferometers that may be used in a null corrector include, but are not limited to, a Twyman-Green interferometer, a Fizeau interferometer, a Mach-Zehnder interferometer, or another type of interferometer as would be apparent to a person skilled in the relevant art(s). The actual manner in which the null corrector is used to analyze the optical surface is dependent on the particular interferometer included in the null corrector.

FIG. 1 illustrates an example Fizeau interferometer 100 that may be used to analyze an optical surface. Fizeau interferometer 100 includes a laser 101, a beam combiner 103, and an imaging lens 111. In operation, laser 101 provides electromagnetic radiation in the form of laser light. The laser light is directed toward a transmission sphere 105 and a reference surface 107. Transmission sphere 105 may be a transmission sphere as manufactured by Zygo Corporation of Middlefield, Conn. At reference surface 107, a portion of the laser light (referred to herein as the reference beam) is reflected back toward beam combiner 103 and a portion of the laser light (referred to herein as the test beam) is transmitted toward a test mirror 109. In an embodiment, approximately four percent of the laser light is reflected back toward beam combiner 103. The reference beam is directed toward imaging lens 111 by beam combiner 103. The test beam is conditioned by reference surface 107 and then incident on a test mirror 109.

Figure 2A:
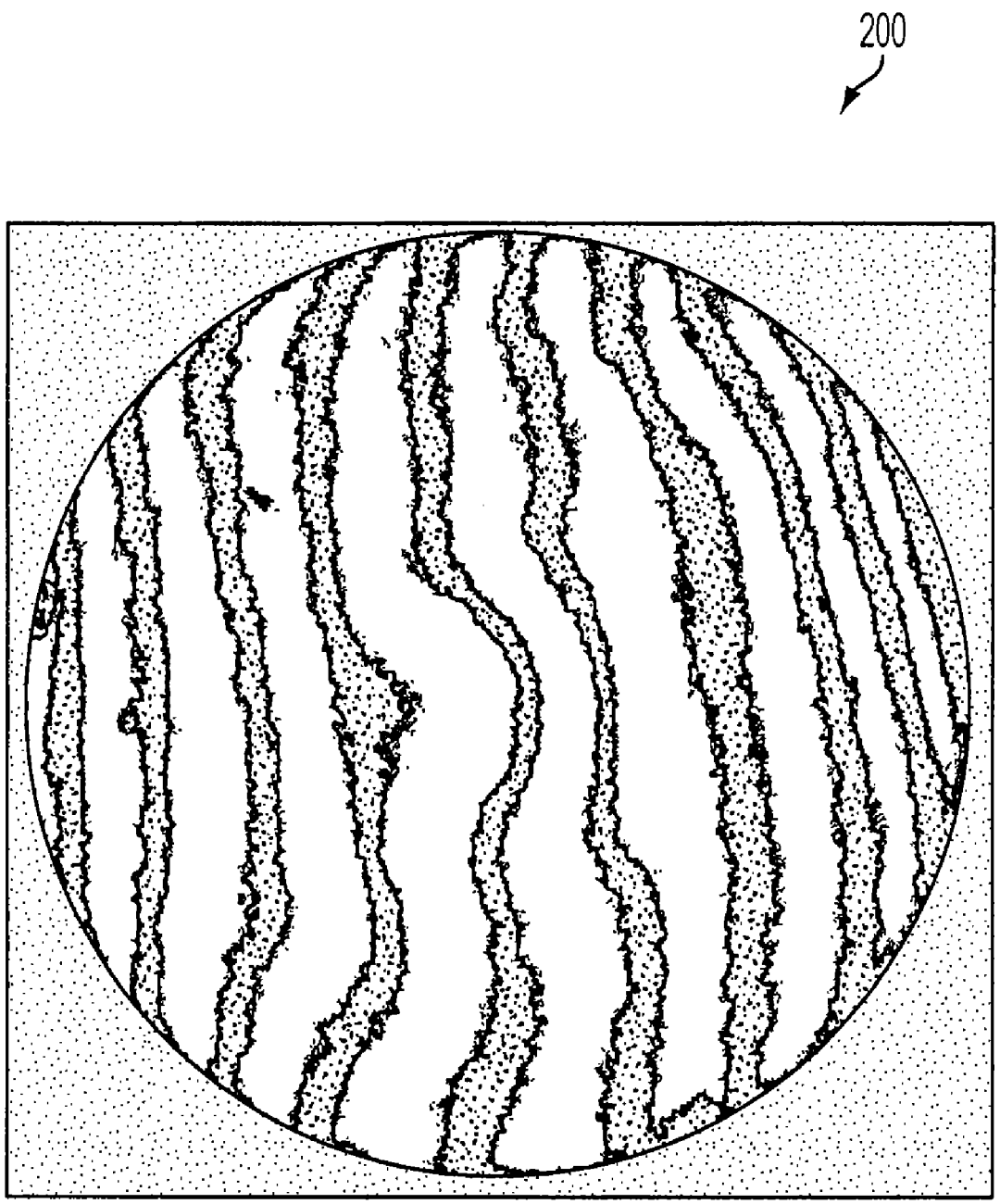
FIG. 2A depicts an example fringe pattern that may be used to analyze a surface.
Figure 2B:
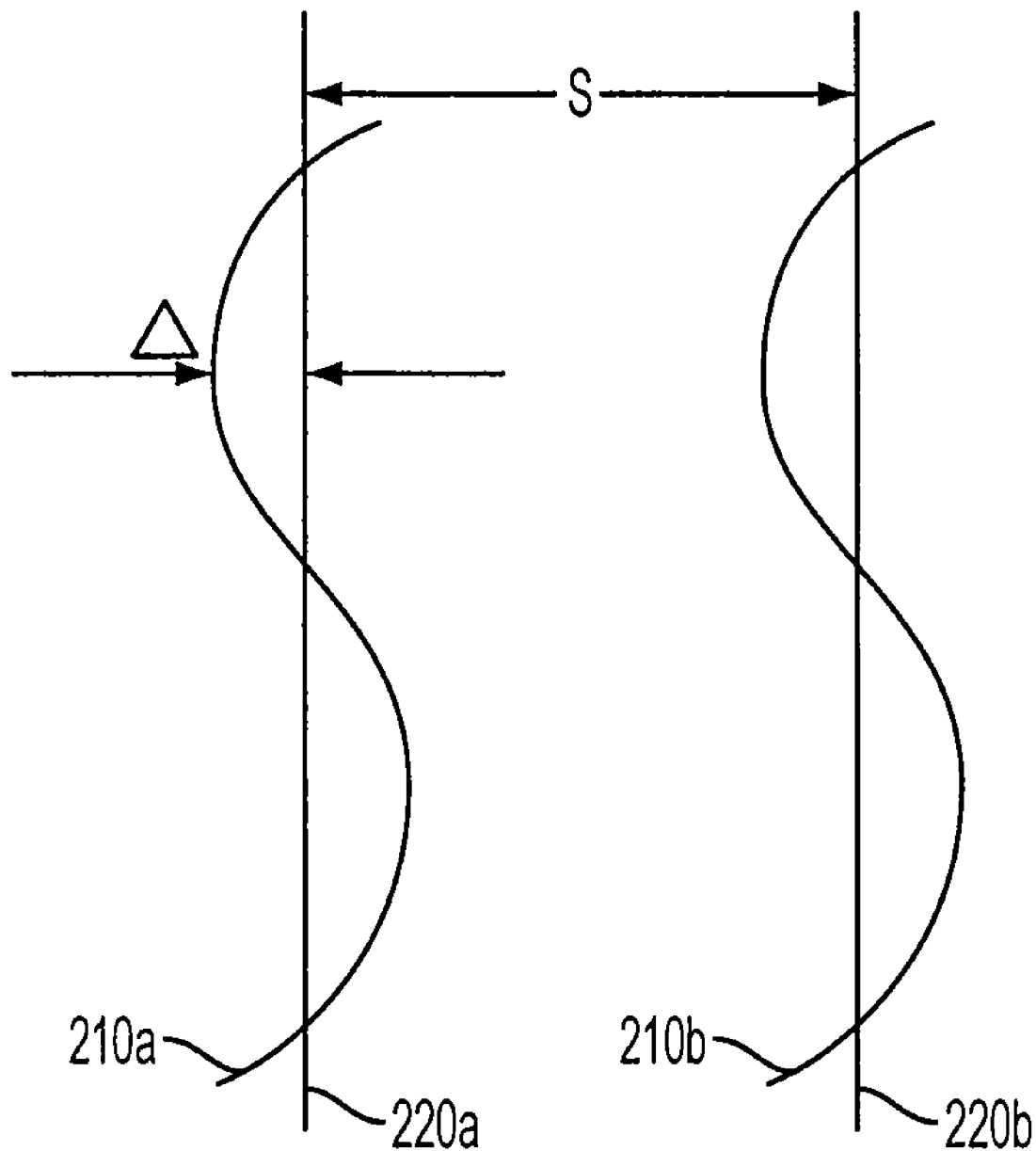
FIG. 2B illustrates how fringes in a fringe pattern may be used to analyze an optical surface.

If test mirror 109 is ideal, the beam conditioned by reference surface 105 should impinge on test mirror 109 at (approximately) normal incidence. Test mirror 109 further conditions the test beam. Thereafter, the test beam is transmitted back through reference surface 107 and transmission sphere 105 before impinging on beam combiner 103. After being incident on beam combiner 103, the test beam is focused by imaging lens 111 and interferes with the reference beam resulting in an interferogram 113, or more generally a fringe pattern. FIGS. 2A and 2B illustrate an example fringe pattern, which is discussed below. Based on interferogram 113, test mirror 109 may be analyzed.

FIG. 2A depicts an example fringe pattern 200, such as for example interferogram 113. A fringe pattern is an interference pattern resulting from the interference of electromagnetic radiation passing through two diffraction gratings. As illustrated in FIG. 2A, the interference pattern includes bright and dark fringes. The bright fringes are caused by constructive interference between the electromagnetic radiation passing through the two diffraction gratings. The dark fringes are caused by destructive interference between the electromagnetic radiation passing through the two diffraction gratings. If the two gratings are not identical straight-line gratings, the fringe pattern will not consist of straight equally spaced fringes.

FIG. 2B depicts a simplified view of a portion of a fringe pattern illustrating how this pattern may be used to analyze a test optical surface. Represented in FIG. 2B are an ideal set of bright fringes 220a, 220b and an actual set of bright fringes 210a, 210b. Bright fringes 220 are "ideal" in the sense that these lines represent what a portion of the fringe pattern should look like provided the electromagnetic radiation conditioned by the reference optic impinges on the test optical surface at normal incidence—i.e., the test optical surface is fabricated within predetermined specifications. Bright fringes 210 represent the actual bright fringes in the fringe pattern.

The deviation of actual bright fringes 210 from ideal bright fringes 220 may be used as a measure of the quantitative error in the cross-sectional height of the test optical surface. In particular, the surface height error, h, of the test optical surface is given by the following equation:

$$h = \left(\frac{\lambda}{2}\right)\left(\frac{\Delta}{S}\right),$$

wherein $\lambda$ represents the wavelength of the electromagnetic radiation, $\Delta$ represents the distance between ideal bright fringes 220a and 220b, and S represents the maximum deviation of actual bright fringe 210a from ideal bright fringe 220a.

III. Example Diffractive Null Correctors Employing an SLM in Accordance with an Embodiment of the Present Invention An SLM based diffractive test optic in accordance with an embodiment of the present invention may be used to test mirrors, lenses, and optical systems. Such an SLM is a "set-and-forget" design. The grating pattern on the SLM is fixed for each application, so there is no need to change the actuation state of the SLM pixels, as is typically the case for a maskless lithography system. The actuation state of the SLM pixels may be relatively simple because no rapid adjustment of the actuation states is required to create a gray scale effect. However, gray scaling effects may be used in accordance with an embodiment of the present invention to, for example, improve fringe contrast of an interferogram.

A grating period range of approximately 4 to 100 µm is generally used in lithographically produced diffractive null correctors. Currently fabricated SLMs may include pixels that are, for example, approximately 2×2 µm or approximately 8×8 µm. Thus, currently fabricated SLMs may be used in a diffractive null corrector employing an SLM in accordance with an embodiment of the present invention.

A diffractive null corrector employing an SLM in accordance with an embodiment of the present invention may be used to test a concave optical surface, a convex optical surface, or a combination thereof. Described in more detail below are examples in which a diffractive null corrector employing an SLM is used to perform a null test of a concave optical surface and a convex optical surface.

These examples are presented for illustrative purposes only, and not limitation. In these examples, the null test is performed by reflecting electromagnetic radiation off of an optical surface being tested. The present invention, however, is not limited to such reflective embodiments. Based on the description contained herein, a person skilled in the relevant art(s) will understand how to implement a diffractive null corrector employing an SLM, wherein the null test is performed by transmitting electromagnetic radiation through an optical surface being tested. It is to be appreciated that both reflective and transmissive diffractive null correctors employing SLMs are contemplated within the spirit and scope of the present invention.

Figure 3:
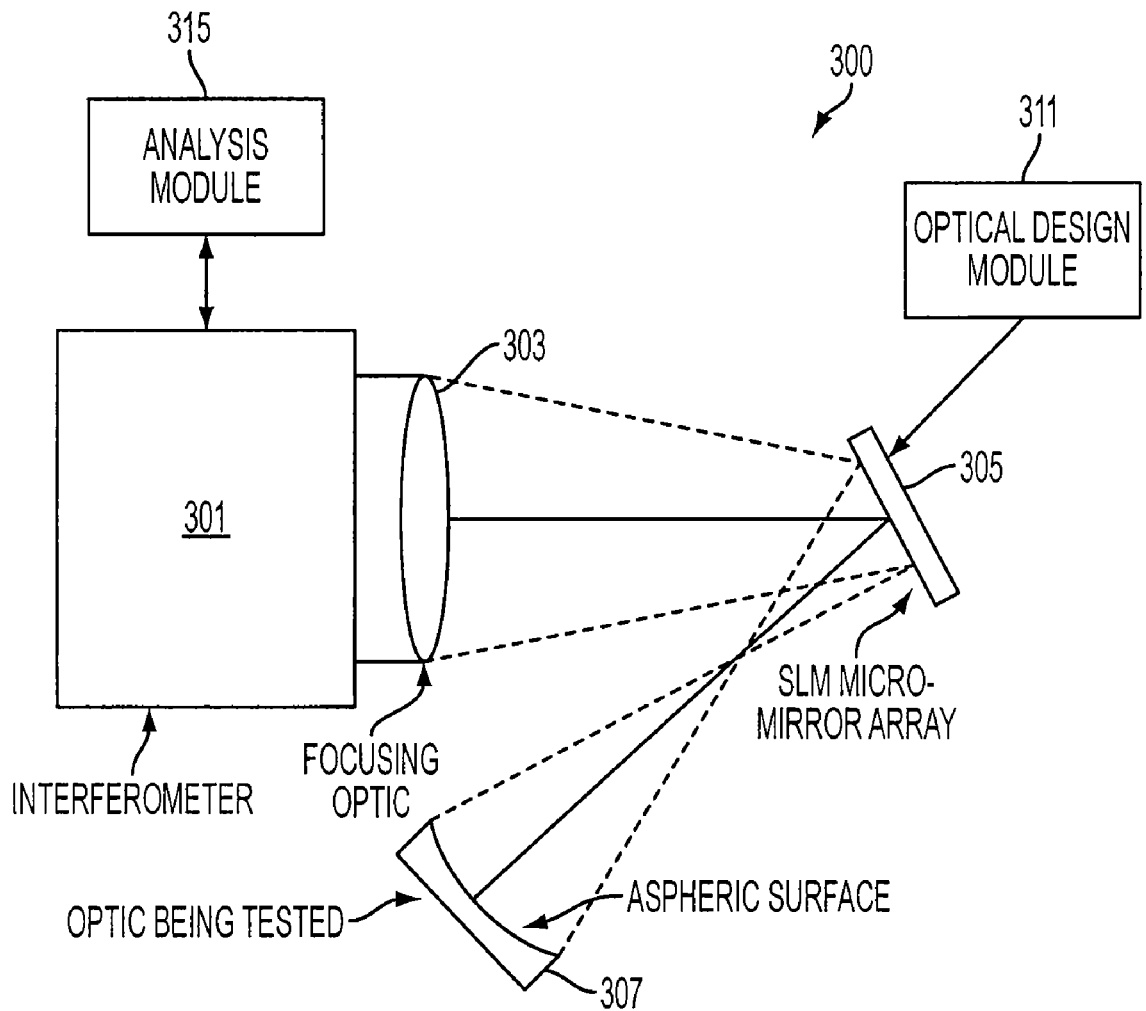
FIG. 3 is a block diagram illustrating a diffractive null corrector employing an SLM that is configured to analyze a concave (aspheric) surface in accordance with an embodiment of the present invention.
Figure 5:
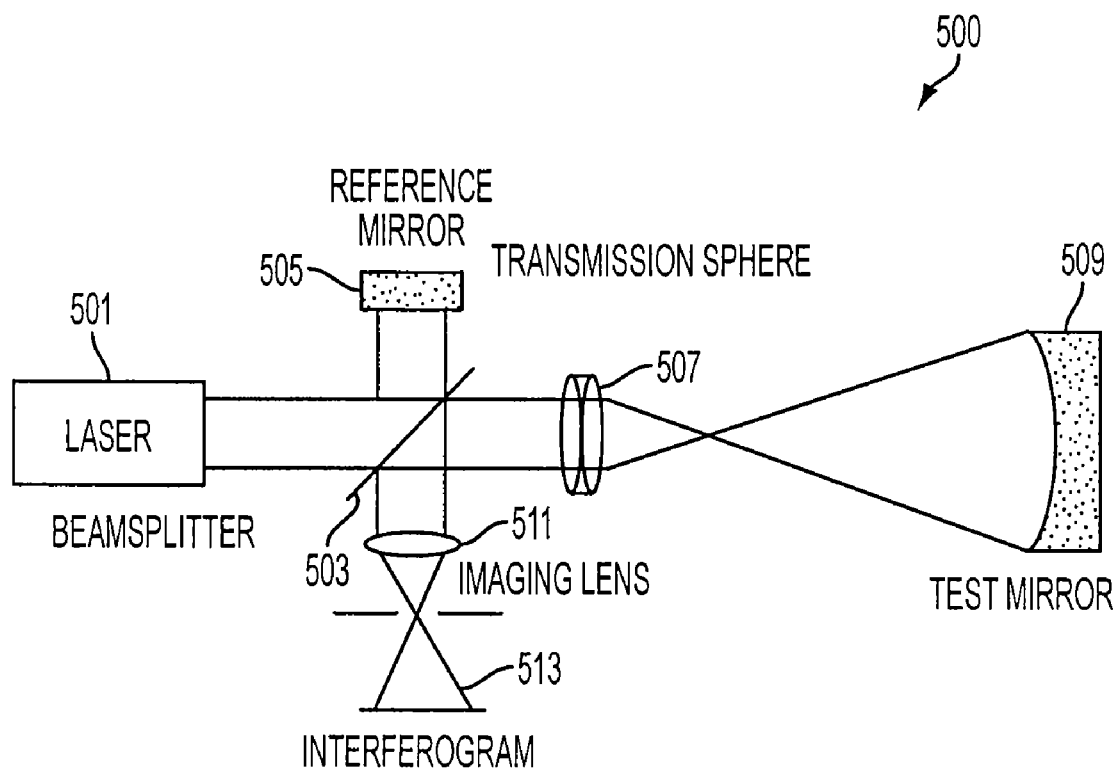
FIG. 5 depicts a diagram of an example Twyman-Green interferometer that may be used to test an optical surface in accordance with an embodiment of the present invention.
Figure 6:
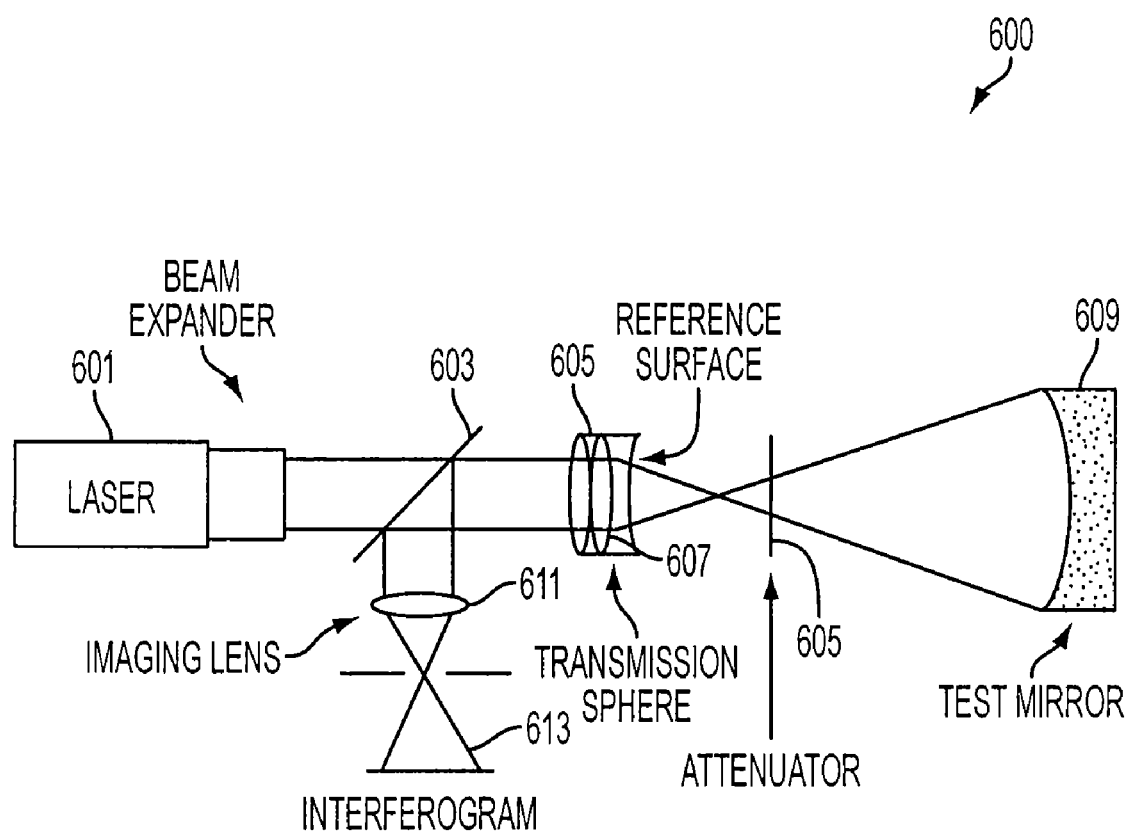
FIG. 6 depicts a diagram of another example Fizeau interferometer that may be used to test a highly reflective optical surface in accordance with an embodiment of the present invention.
Figure 7:
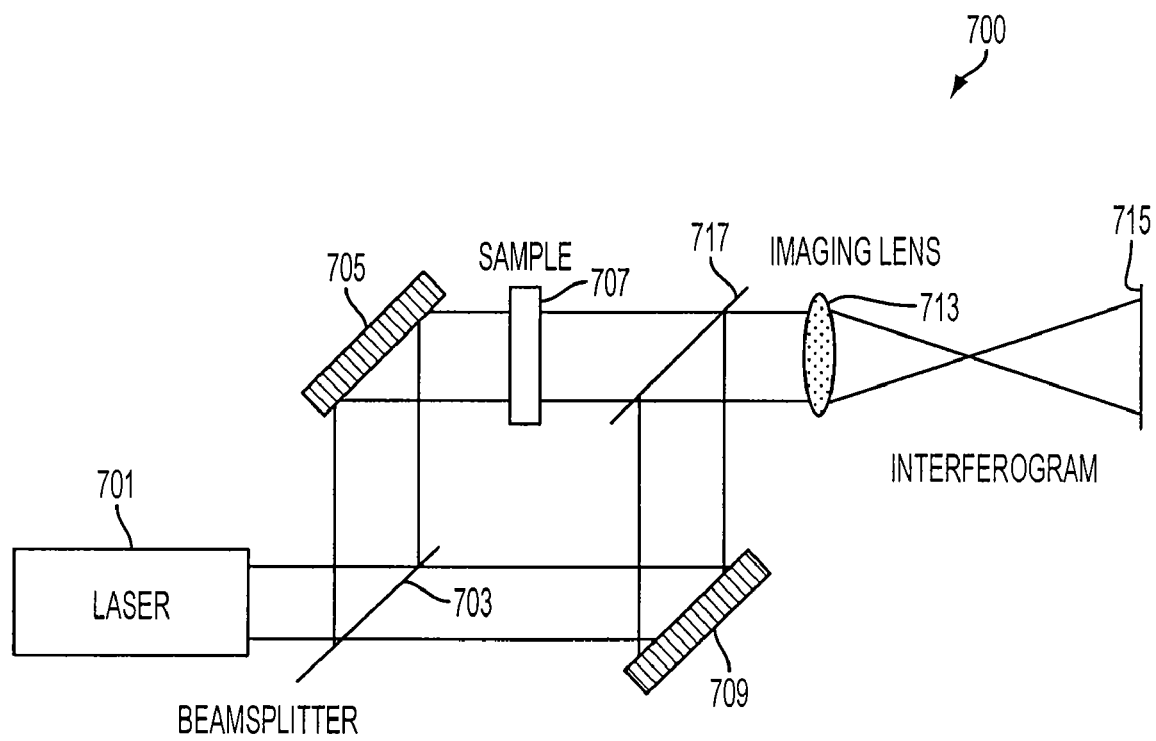
FIG. 7 depicts a diagram of an example Mach-Zehnder interferometer that may be used to test an optical surface in accordance with an embodiment of the present invention.

A. An Example Diffractive Null Corrector Configuration For Analyzing A Concave Aspherical Optical Surface in Accordance with an Embodiment of the Present Invention FIG. 3 depicts a block diagram illustrating an embodiment in which a diffractive null corrector 300 is used to test a concave aspheric surface 307. Diffractive null corrector 300 includes an interferometer 301, a focusing optic 303, an SLM 305, and an optical design module 311. Interferometer 301 may be any type of interferometer as would be apparent to a person skilled in the relevant art(s), such as a Fizeau interferometer, a Twyman-Green interferometer, or a Mach-Zehnder interferometer. In an embodiment, interferometer 301 is a Fizeau interferometer as illustrated in FIG. 1. In alternative embodiments, interferometer 301 may be a Twyman-Green interferometer as illustrated in FIG. 5, a Fizeau interferometer that includes an attenuator as illustrated in FIG. 6, or a Mach-Zehnder interferometer as illustrated in FIG. 7.

Focusing optic 303 may be a single lens, a collection of lens, and may include mirrors and other optical elements as would be apparent to a person skilled in the relevant art(s). Focusing optic 303 functions to focus electromagnetic radiation to an f-number corresponding to an optical surface 307 being tested. Such focusing optics are well-known to persons skilled in the relevant art(s). For example, focusing optic 303 may comprise a transmission sphere as manufactured by Zygo Corporation of Middlefield, Conn.

Figure 8:
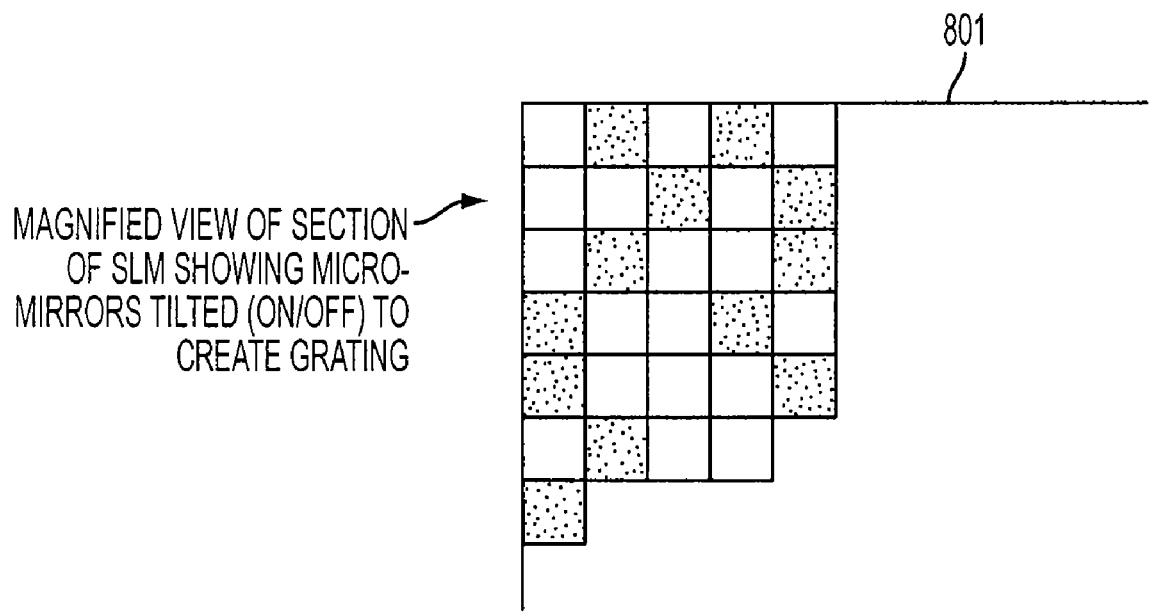
FIG. 8 depicts a view of a portion of an example SLM illustrating micro-mirrors tilted (on/off) to create a grating pattern in accordance with an embodiment of the present invention.

SLM 305 comprises a plurality of individually controllable elements or pixels. Each pixel is adapted to reflect (transmit) electromagnetic radiation. The states of the pixels of SLM 305 may be varied to adjust the amount of electromagnetic radiation that is reflected (transmitted). Example SLM pixel states are ON, OFF, or in an intermediate state between ON and OFF, hereinafter referred to as a "graytone." In an ON state, an SLM pixel reflects (transmits) a maximum amplitude of electromagnetic radiation. In an OFF state, an SLM pixel reflects (transmits) no electromagnetic radiation. A gray tone of an SLM pixel reflects (transmits) an amplitude of electromagnetic radiation that is less than the ON state, but greater than the OFF state. FIG. 8 depicts a section 801 of SLM 305 illustrating SLM pixels in either an ON or OFF state. Unshaded boxes in section 801 of SLM 305 represent pixels in the ON state; whereas, shaded boxes represent pixels in the OFF state.

In an embodiment, SLM 305 may also change the f-number of the electromagnetic radiation emerging from focusing optic 303. Typically, multiple optical elements (such as transmission spheres) are required to provide an electromagnetic beam having an f-number that correctly corresponds to an optical surface being analyzed. In accordance with this embodiment, however, a single optical element (transmission sphere) may be used because SLM 305 may be used to modify the f-number to correspond with the optical surface being analyzed.

Optical design module 311 performs two functions. First, it determines a diffraction grating required to perform a null test of optical surface 307. In other words, an input ray incident on the diffraction grating will be diffracted to be incident on a test optical surface. If the test optical surface is ideal, the diffracted ray will impinge upon the test optical surface at normal incidence. Second, optical design module 311 converts information regarding the diffraction grating required to perform a null test into instructions for SLM 305. The instructions control which SLM pixels are to be turned ON and which SLM pixels are to be turned OFF in order to perform a null test of optical surface 307. Optical design module 311 may be implemented in software, hardware, firmware, or a combination thereof, as would be apparent to a person skilled in the relevant art(s).

The operation of diffractive null corrector 300 is now described. Referring to FIG. 3, interferometer 301 provides a beam of electromagnetic radiation. The beam is directed toward focusing optic 303. At focusing optic 303, a portion of the beam of electromagnetic radiation (referred to herein as the reference beam) is reflected back toward interferometer 301 and a portion of the beam of electromagnetic radiation (referred to herein as the test beam) is transmitted through focusing optic 303. The test beam that is transmitted through focusing optic 303 results in a spherical wave that is directed toward SLM 305. Optical design module 311 provides instructions to SLM 305 controlling which pixels are turned ON and which pixels are turned OFF resulting in a grating pattern. After the spherical wave impinges on SLM 305, an aspheric wavefront is produced by the grating pattern on SLM 305. The aspheric wavefront produced by the grating pattern results in rays of the test beam being directed toward approximately normal incidence on optical surface 307.

After being conditioned by optical surface 307, the rays are reflected back to the grating pattern on SLM 305. At the grating pattern the aspheric wavefront is re-patterned by SLM 305, and then reenters interferometer 301 where an interference pattern is produced. If concave optical surface 307 has an error, the rays reflected back from concave optical surface 307 travel a different path than the rays from the reference beam of electromagnetic radiation. The different path produces an optical path difference ("OPD") which results in the interference pattern being distorted similar to the fringe pattern shown in FIG. 2A. The OPD error measured is used to analyze concave optical surface 307 in a similar manner to that described above with reference to FIG. 2B.

In an embodiment, interferometer 301 is coupled to an analysis module 315 that analyzes optical surface 307 based on the interference pattern. Analysis modules for analyzing an interference pattern are known to persons skilled in the relevant art(s). Analysis module 315 may be implemented in software, firmware, hardware, or a combination thereof. The analysis may be used, for example, to determine how to polish concave optical surface 307 to make the surface conform to predetermined specifications.

In a typical null corrector, an attenuator is used to attenuate electromagnetic radiation reflected off of a highly reflective optical surface (such as a telescope mirror) being analyzed. However, unlike typical null correctors, such an attenuator is not necessary in diffractive null corrector in accordance with an embodiment of the present invention. For example, in an embodiment, diffractive null corrector 300 attenuates electromagnetic radiation reflected off of optical surface 307 by using gray scaling techniques of SLM 305. In another embodiment, actuation states of pixels of SLM 305 may be calibrated using a calibration technique described above. In a further embodiment, the actuation states of pixels of SLM 305 may be adjusted to compensate for errors caused by elements of diffractive null corrector 300. Such errors may be caused by defects in interferometer 301, focusing optic 303, or another element included in diffractive null corrector 300, as would be apparent to a person skilled in the relevant art(s).

Figure 4:
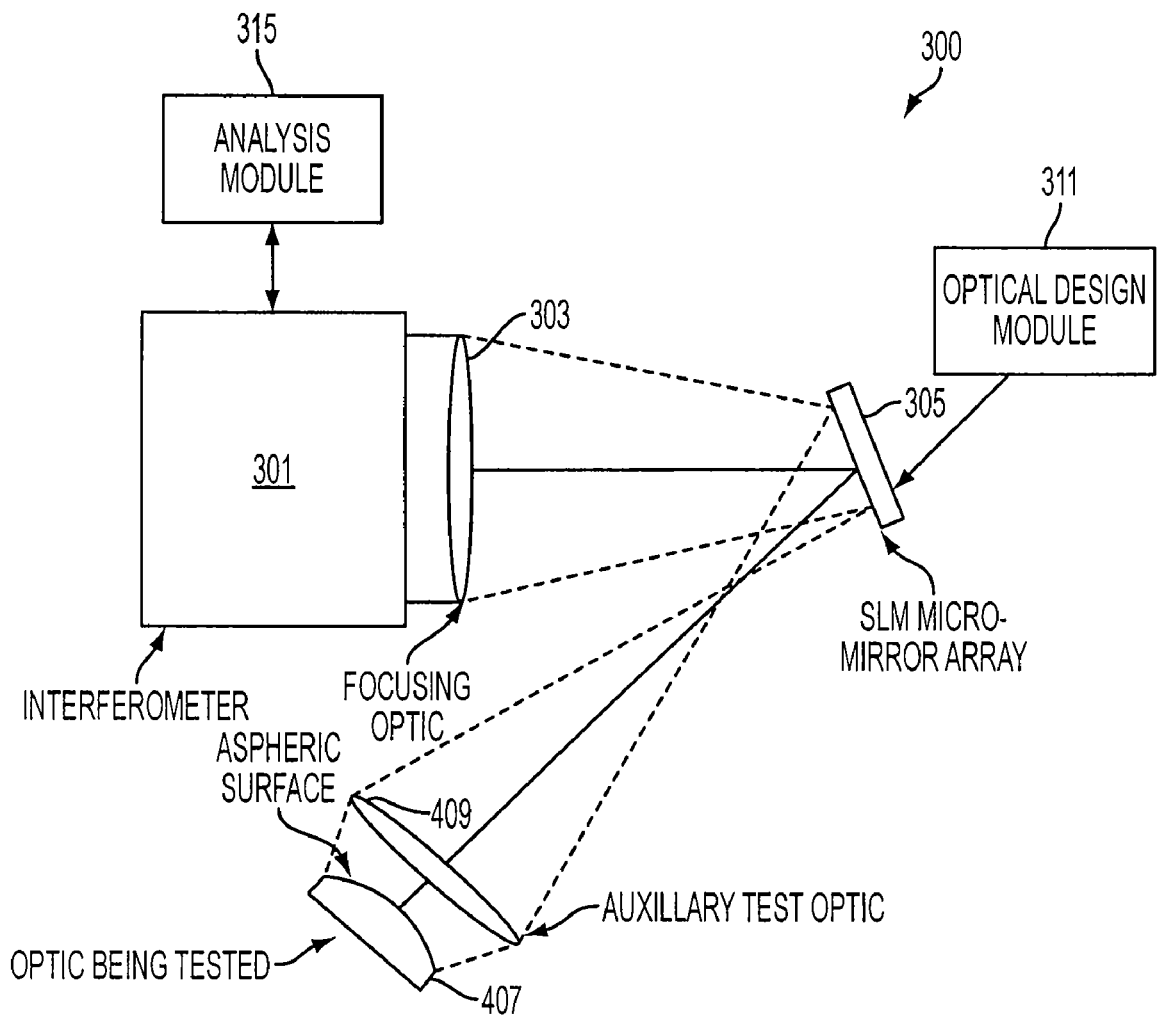
FIG. 4 is a block diagram illustrating a diffractive null corrector employing an SLM that is configured to analyze a convex (aspheric) surface in accordance with an embodiment of the present invention.

B. An Example Diffractive Null Corrector Configuration for Analyzing a Convex Aspheric Optical Surface in Accordance with an Embodiment of The Present Invention FIG. 4 depicts a block diagram illustrating an embodiment in which diffractive null corrector 300 is used to test a convex aspheric surface 407. In the embodiment shown in FIG. 4, diffractive null corrector 300 includes interferometer 301, focusing optic 303, SLM 305, and optical design module 311. In addition, diffractive null corrector 300 may include an auxiliary optic 409 associated with a convex optical surface 407 being tested.

The embodiment of diffractive null corrector 300 shown in FIG. 4 functions in a similar manner to the embodiment shown in FIG. 3, except that auxiliary optic 409 may be used. If convex optical surface 407 is smaller than SLM 305, then convex optical surface 407 can be tested without auxiliary optic 409. If, however, convex optical surface 407 is larger than SLM 305, auxiliary optic 409 is needed to cause the diffracted electromagnetic radiation from SLM 305 to be incident on convex optical surface 407. Because auxiliary optic 409 changes the wavefront shape, it is included in the diffractive null correctors design process. The combination of the grating pattern on SLM 305 and auxiliary optic 409 produces an aspheric wavefront shape that strikes convex optical surface 407 at (nearly) normal incidence. In an embodiment, a diffraction pattern on SLM 305 is used to align auxiliary optic 409 as described above.

Other types of interferometers may be used in a diffractive null corrector that employs an SLM in accordance with an embodiment of the present invention. For example, FIG. 5 depicts an illustration of an example Twyman-Green interferometer 500 used to analyze a test mirror 509. Twyman-Green interferometer 500 includes a laser 501, a beam splitter 503, an imaging lens 511, and a transmission sphere 507. Twyman-Green interferometer 500 operates in a substantially similar manner to interferometer 100 described above. For example, using a reference mirror 505, test mirror 509 may be analyzed based on an interferogram 513. In an embodiment, Twyman-Green interferometer 500 serves as interferometer 301 within null corrector 300.

FIG. 6 depicts an illustration of another example Fizeau interferometer 600 used to analyze a test mirror 609. Fizeau interferometer 600 includes a laser 601, a beam splitter 603, and an imaging lens 611. An attenuator 605 attenuates electromagnetic radiation reflecting off a highly reflective surface of a test mirror 609. Except for the attenuation of the electromagnetic radiation by attenuator 605, Fizeau interferometer 600 operates in a substantially similar manner to interferometer 100 described above. For example, using a reference surface 607 and a transmission sphere 605, test mirror 609 may be analyzed based on an interferogram 613. In an embodiment, Fizeau interferometer 600 serves as interferometer 301 within null corrector 300.

FIG. 7 depicts an illustration of an example Mach-Zehnder interferometer 700 used to analyze a sample optical surface 707. Mach-Zehnder interferometer 700 includes a laser 701, a beam splitter 703, a beam combiner 717, an imaging lens 713, and a reflective optical surface 709. In operation, laser 701 provides a beam of electromagnetic radiation in the form of laser light. The beam of laser light is split into a test beam and a reference beam by beam splitter 703. The test beam is directed toward an SLM 705 (similar to SLM 305 described above), and then transmitted through and conditioned by sample optical surface 707. The reference beam is directed toward reflective optical surface 709. The test beam and the reference beam are then recombined by second beam splitter 717. The recombined beam is focused by imaging lens 713 resulting in an interferogram 715. Sample optical surface 707 may be analyzed based on interferogram 715 as described above and as is well-known in the relevant art(s). In an embodiment, Mach-Zehnder interferometer 700 serves as interferometer that is used within null corrector in accordance with an embodiment of the present invention.

Figure 9:
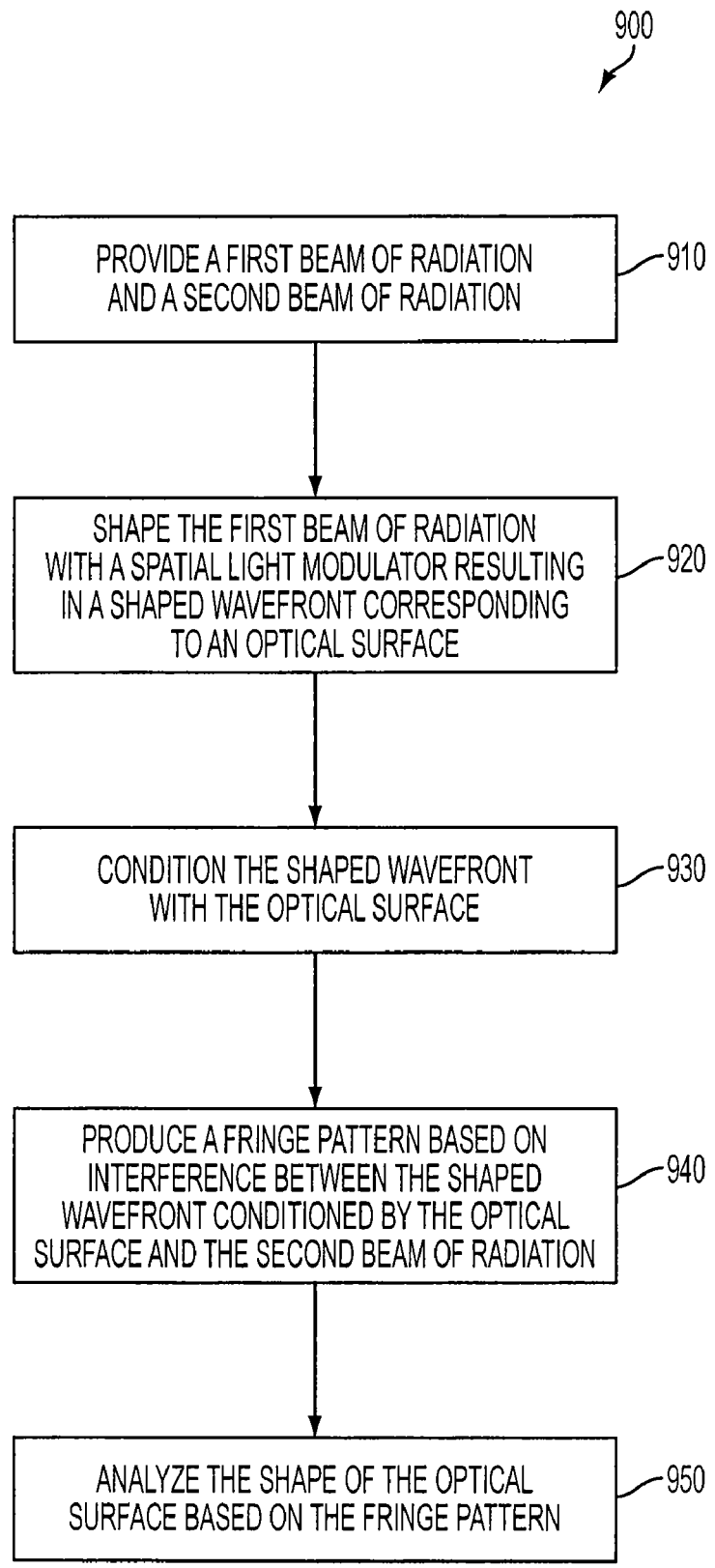
FIG. 9 depicts a block diagram illustrating a method for analyzing an optical surface in accordance with an embodiment of the present invention.

IV. An Example Method for Analyzing an (Aspheric) Optical Surface in Accordance with an Embodiment of the Present Invention FIG. 9 depicts a block diagram illustrating a method 900 for analyzing an aspheric optical surface in accordance with an embodiment of the present invention. Method 900 may be implemented by the configuration of diffractive null corrector 300 depicted in FIG. 3, the configuration of diffractive null corrector 300 depicted in FIG. 4, or some other configuration, as would be apparent to a person skilled in the relevant art(s).

Method 900 begins at a step 910 in which a first and second beam of electromagnetic radiation are provided. In an embodiment, the first beam is a portion of the electromagnetic radiation that is reflected off focusing optic 303 and the second beam is a portion of the electromagnetic radiation that is transmitted through focusing optic 303, as described above with reference to FIG. 3. The first and second beams may be, for example, beams of laser light, or a similar source of electromagnetic radiation.

In a step 920, the first beam of electromagnetic radiation is shaped by an SLM to produce a shaped wavefront corresponding to an optical surface being tested. The SLM used to shape the first beam may be SLM 307 shown in FIGS. 3 and 4, or some other SLM as would be apparent to a person skilled in the relevant art(s). The optical surface being tested may be concave, convex, reflective, transmissive, spherical, aspherical, or the like.

In a step 930, the shaped wavefront from the SLM is conditioned by the optical surface being tested. For example, the shaped wavefront may reflect off the optical surface (as illustrated in FIGS. 3 and 4). In another example, the shaped wavefront may be transmitted through the optical surface being tested (as illustrated, for example, in FIG. 7).

In a step 940, a fringe pattern is produced based on interference between (i) the shaped wavefront that was conditioned by the optical surface being tested and (ii) the second beam of electromagnetic radiation. For example, the fringe pattern may be similar to the fringe pattern shown in FIG. 2A.

In a step 950, the shape of the optical surface is analyzed based on the fringe pattern produced in step 940. As mentioned above, methods for analyzing an optical surface based on a fringe pattern are well-known to persons skilled in the relevant art(s). For example, the fringe pattern may be analyzed by analysis module 315.

V. An Example Computer Implementation in Accordance with the Present Invention Aspects of the present invention (e.g., interferometer 301, SLM 305, analysis module 315, and optical design module 311) may be implemented using hardware, software or a combination thereof and may be implemented in one or more computer systems or other processing systems. Although manipulations performed by embodiments of the present invention may have been referred to in terms such as adding or comparing (which are commonly associated with mental operations performed by a human operator), no such capability of a human operator is necessary, or desirable in most cases, in any of the operations described herein which form part of the present invention. The operations of the present invention are machine operations. Useful machines for performing the operation of the present invention include general purpose digital computers or similar devices.

Figure 10:
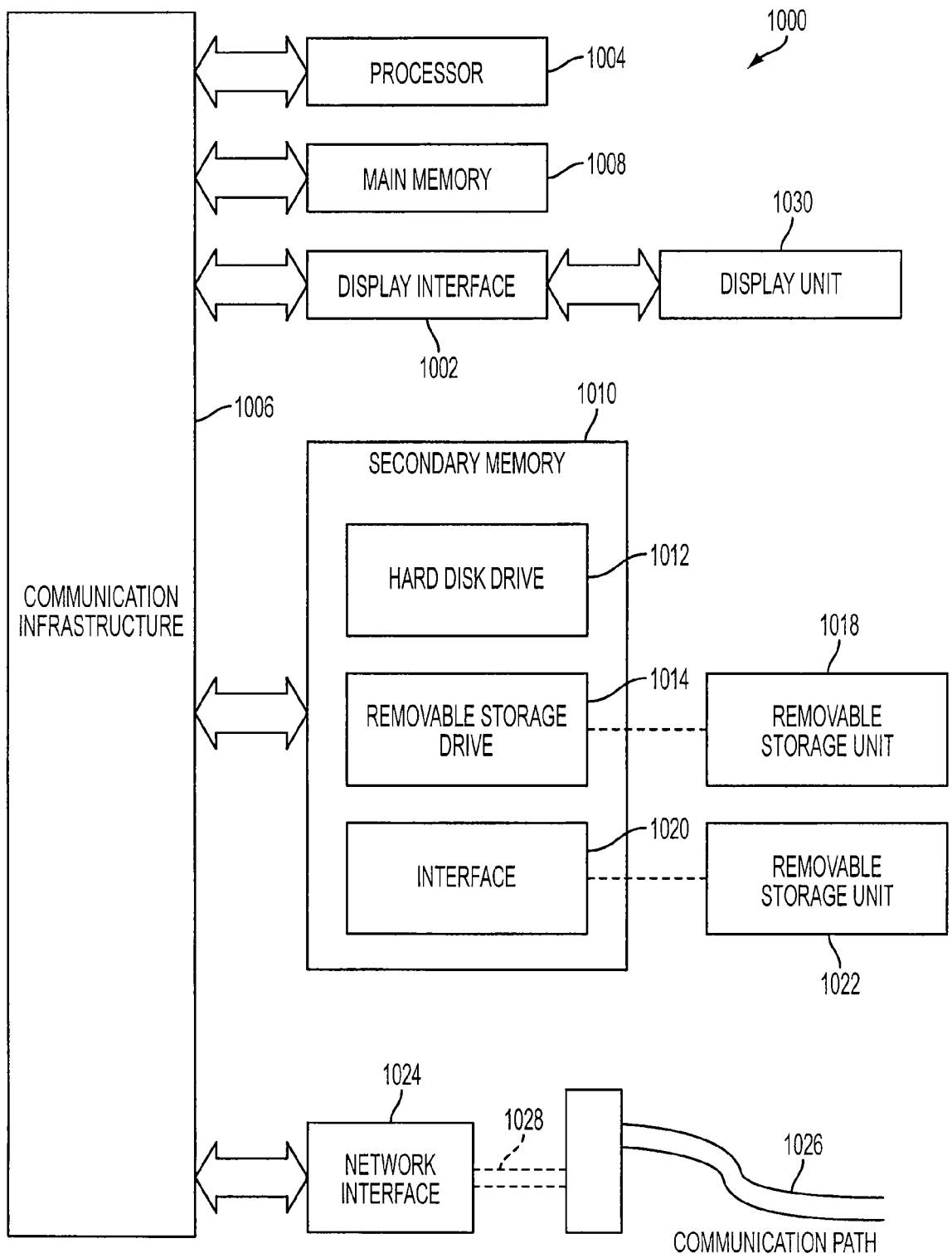
FIG. 10 depicts a block diagram of an example computer system in which an embodiment of the present invention may be implemented.

In fact, in one embodiment, embodiments of the present invention are directed toward one or more computer systems capable of carrying out all or part of the functionality associated with interferometer 301, SLM 305, analysis module 315, and optical design module 311. An example of a computer system 1000 is shown in FIG. 10.

The computer system 1000 includes one or more processors, such as processor 1004. Processor 1004 may be a general purpose processor (such as, a CPU) or a special purpose processor (such as, a GPU). Processor 1004 is connected to a communication infrastructure 1006 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 1000 may include a display interface 1002 that forwards graphics, text, and other data from communication infrastructure 1006 (or from a frame buffer not shown) for display on display unit 1030.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018 represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar devices for allowing computer programs or other instructions to be loaded into computer system 1000. Such devices may include, for example, a removable storage unit 1022 and an interface 1020. Examples of such may include a program cartridge and cartridge interface (such as that found in video game devices), a removable memory chip (such as an erasable programmable read only memory (EPROM), or programmable read only memory (PROM)) and associated socket, and other removable storage units 1022 and interfaces 1020, which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path (e.g., channel) 1026. This channel 1026 carries signals 1028 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 1014, a hard disk installed in hard disk drive 1012, and signals 1028. These computer program products provide software to computer system 1000. The invention is directed to such computer program products.

Computer programs (also referred to as computer control logic) are stored in main memory 1008 and/or secondary memory 1010. Computer programs may also be received via communications interface 1024. Such computer programs, when executed, enable the computer system 1000 to perform the features of the present invention, as discussed herein. In particular, the computer programs, when executed, enable the processor 1004 to perform the features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012 or communications interface 1024. The control logic (software), when executed by the processor 1004, causes the processor 1004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A system for testing an optical surface, comprising:
an interferometer that provides electromagnetic radiation;
an optical element that conditions the electromagnetic radiation to provide a first beam of radiation and a second beam of radiation; and
a spatial light modulator (SLM) comprising pixels that are actuated to form a grating pattern configured to diffract the first beam of radiation to form a shaped wavefront corresponding to an optical surface,
wherein the shaped wavefront is incident on and conditioned by the optical surface, and
wherein the shape of the optical surface is analyzed based on a fringe pattern resulting from interference between the shaped wavefront conditioned by the optical surface and the second beam of radiation.

2. The system of claim 1, further comprising:
an optical design module configured to receive a null corrector design corresponding to the optical surface and provide instructions for the SLM.

3. The system of claim 1, wherein the optical element is a focusing optic that focuses the first beam of radiation on the SLM.

4. The system of claim 1, further comprising:
an analysis module that analyzes the fringe pattern.

5. The system of claim 1, further comprising:
an auxiliary optic configured also to condition the shaped wavefront.

6. The system of claim 5, wherein the SLM is configured to shape a wavefront of light to align the auxiliary optic prior to shaping the wavefront of the first beam of radiation.

7. The system of claim 1, wherein the SLM is configured to attenuate the shaped wavefront conditioned by the optical surface to compensate for low fringe contrast in the fringe pattern.

8. The system of claim 1, wherein the SLM is configured to shape a wavefront of the first beam of radiation to compensate for errors in the interferometer resulting in a shaped wavefront corresponding to an optical surface.

9. The system of claim 1, wherein the optical surface is a concave surface, a convex surface, a reflective surface, or a transmissive surface.

10. The system of claim 1, wherein the interferometer comprises one of a Fizeau interferometer, a Twyman-Green interferometer, or a Mach-Zehnder interferometer.

11. A method for testing an optical surface, comprising:
providing a first beam of radiation and a second beam of radiation;
diffracting the first beam of radiation with a grating pattern formed by pixels of a spatial light modulator (SLM) to form a shaped wavefront corresponding to the optical surface;
conditioning the shaped wavefront with the optical surface;
producing a fringe pattern based on interference between the shaped wavefront conditioned by the optical surface and the second beam of radiation; and
analyzing the shape of the optical surface based on the fringe pattern.

12. The method of claim 11, further comprising:
reading a null corrector design corresponding to the optical surface into and providing instructions for the SLM based thereon.

13. The method of claim 11, further comprising:
focusing the first beam of radiation on the SLM with a focusing optic.

14. The method of claim 11, further comprising:
analyzing the shape of the optical surface based on the fringe pattern.

15. The method of claim 11, further comprising:
conditioning the shaped wavefront with an auxiliary optic.

16. The method of claim 15, wherein prior to shaping a wavefront of the first beam of radiation, the method comprises:
aligning the auxiliary optic using the SLM.

17. The method of claim 11, further comprising:
attenuating the shaped wavefront conditioned by the optical surface to compensate for low fringe contrast in the fringe pattern.

18. The method of claim 11, wherein the diffracting step comprises:
shaping a wavefront of the first beam of radiation with a spatial light modulator (SLM) to compensate for errors in the first beam of radiation resulting in a shaped wavefront corresponding to the optical surface.

19. The method of claim 11, wherein the diffracting step comprises:

shaping a wavefront of the first beam of radiation with a spatial light modulator (SLM) that results in a shaped wavefront corresponding to an optical surface, wherein the optical surface is a concave surface, a convex surface, a reflective surface, or a transmissive surface.

20. A system for testing an optical surface, comprising:

an interferometer that provides a first beam of radiation and a second beam of radiation; and a spatial light modulator (SLM) comprising pixels that are actuated to form a grating pattern configured to diffract the first beam of radiation to form a shaped wavefront corresponding to an optical surface, wherein the shaped wavefront is incident on and conditioned by the optical surface, and wherein the shape of the optical surface is analyzed based on a fringe pattern resulting from interference between the shaped wavefront conditioned by the optical surface and the second beam of radiation.

* * * * *

UNITED STATES PATENT AND TRADEMARK OFFICE
CERTIFICATE OF CORRECTION

PATENT NO.         : 7,443,514 B2                                           Page 1 of 1
APPLICATION NO.    : 11/540674
DATED              : October 28, 2008
INVENTOR(S)        : Harned et al.

It is certified that error appears in the above-identified patent and that said Letters Patent is hereby corrected as shown below:

<u>Column 14</u>
Line 42 please replace "surface into and" with --surface and--.

Signed and Sealed this

Seventeenth Day of February, 2009

JOHN DOLL
*Acting Director of the United States Patent and Trademark Office*